United States Patent
Gasser et al.

[11] Patent Number: 5,913,962
[45] Date of Patent: Jun. 22, 1999

[54] ESPRESSO BREWING-HEAD UNIT

[75] Inventors: Ruedy Gasser, Bürglen; Jürg Strub, Oberägeri, both of Switzerland

[73] Assignee: Maxs Ag, Sachseln, Switzerland

[21] Appl. No.: 09/041,724

[22] Filed: Mar. 13, 1998

[30] Foreign Application Priority Data

Mar. 17, 1997 [DE] Germany .......................... 197 11 025

[51] Int. Cl.⁶ .................................................. A47J 31/24
[52] U.S. Cl. .......................... 99/293; 99/295; 99/302 R; 99/323; 210/477; 210/481
[58] Field of Search .............. 99/279, 293, 295, 99/302 R, 323; 210/473, 474, 477, 479, 481, 482, 455

[56] References Cited

U.S. PATENT DOCUMENTS

| | | | |
|---|---|---|---|
| 4,123,228 | 10/1978 | Frei et al. | 422/274 |
| 4,759,274 | 7/1988 | Schmidt | 99/295 |
| 5,127,318 | 7/1992 | Selby, III | 99/295 |
| 5,473,973 | 12/1995 | Cortese | 99/295 |
| 5,636,563 | 6/1997 | Oppermann et al. | 99/285 |
| 5,715,741 | 2/1998 | Gasser et al. | 99/295 |

FOREIGN PATENT DOCUMENTS

| | | |
|---|---|---|
| 0 663 172 | 7/1995 | European Pat. Off. . |
| 12 43 359 | 6/1967 | Germany . |
| 2 068 821 | 8/1981 | United Kingdom . |

*Primary Examiner*—Reginald L. Alexander
*Attorney, Agent, or Firm*—Pennie & Edmonds LLP

[57] ABSTRACT

The present invention relates to an espresso brewing-head unit comprising locking member for detachable attachment to a brewing unit of an espresso machine. A filter for an espresso machine is meant to be improved in a general manner. To this end, the espresso brewing-head unit comprises a pot-shaped coffee receiving container consisting of a plastic material, whose bottom is provided with a filter plate having coffee exit openings and whose upper edge portion in the side wall has firmly embedded therein a substantially surrounding reinforcement ring of a stable material, preferably metal, the reinforcement ring comprising attachment portions which are part of the locking member.

21 Claims, 10 Drawing Sheets

ESPRESSO BREWING-HEAD UNIT

FIELD OF THE INVENTION

The present invention relates to an espresso brewing-head unit comprising locking means for detachable attachment to a brewing unit of an espresso machine.

As a rule, the filter units which have so far been in common use for espresso machines have a brewing tray which is provided with a radially projecting handle and has inserted thereinto a pot-shaped filter insert. Such a device is, for example, known from German Auslegeschrift 12 43 359. The brewing tray is provided with web portions which are part of a thread and form part of a bayonet-like connection with the brewing unit of the espresso machine. The ground coffee is filled into the pot-shaped filter insert, with the insert being arranged in the brewing tray and the edge of the insert resting in the manner of a flange on an upper edge of the brewing tray. The bayonet lock is moved into its locking position by introducing the web portions, which are part of a thread, into the corresponding bayonet-like receiving portion on the brewing unit and by subsequently rotating the brewing tray. Because of the webs, which are part of a thread, an upward movement is simultaneously performed due to the rotational movement of the brewing tray, so that the flange-like edge of the filter insert is pressed against a seal. The brewing tray with the web portions, which are part of a thread, are made from metal in the prior art for reasons of strength. Such a type is employed in most of the espresso machines used. The brewing tray of metal is either made by deep drawing or by die casting methods.

German Offenlegungsschrift 44 36 080 discloses a strainer carrier which has inserted thereinto in a conventional manner a pot-shaped permanent filter insert. Since the espresso machine described in the document works with a plunger, a pressure-relief means exists in such a manner that the individual components can be slid relative to each other such that a relief opening is released through which the medium can then flow off in a pressure-relieved manner.

Materials which are elastic, if possible, should be used for such an operation. However, there is no exact indication which components should, for instance, be made from plastics. With such a device, a bayonet-like lock is not needed, since the seal is established via the sealing lip on the plunger.

It is now the object of the present invention to provide a filter unit for espresso machines which can be made in a simple and inexpensive way and also withstands frequent detaching and attaching operations on a brewing unit of an espresso machine.

This object is solved by an espresso brewing-head unit with locking means for detachable attachment to a brewing unit of an espresso machine which has a pot-shaped coffee receiving container of plastics, the bottom of which is provided with a filter plate including coffee exit openings and whose upper edge portion in the side wall has firmly embedded therein a substantially surrounding reinforcement ring of a stable material, preferably metal, the reinforcement ring comprising attachment portions which form part of the locking means.

So far in brewing units for espresso machines it has been a common pratice to form said members in an integral manner. The principle of a two-part construction, consisting of brewing tray and filter pot insert, has so far not been abandoned. The reason for this must be seen in the fact that relatively high pressures which have to be borne by the unit can be observed in espresso machines. Moreover, the locking means on the brewing tray must be able to withstand frequent detachment and attachment of the brewing unit of the espresso machine, and this is the reason why a metal type is standard in the prior art.

The present invention is now the first one which provides an espresso brewing-head unit which can very easily be made from plastics in an injection molding process, but nevertheless has adequate strength characteristics. The inventor has found that mainly the upper edge of the coffee receiving container must have a stable design, so that only minimum deformations will be observed in this portion, resulting in good sealing in said portion. Such a construction is achieved with a metal ring which is embedded by employing standard methods, for example injection molding techniques, with the metal ring ensuring the necessary stability. Moreover, the metal ring has attachment portions which also reinforce the locking means, so that the coffee receiving container, which otherwise consists essentially of plastics, has the necessary service life, even in case of frequent detachment and attachment cycles. In addition, the user of the espresso brewing-head unit according to the invention need not always remove and separately clean a pot-shaped permanent filter insert which, when the used ground coffee is knocked out, will automatically fall out from the brewing tray. By contrast, cleaning of the espresso brewing-head unit of the invention is much easier. Another point which should be borne in mind is the decrease in manufacturing costs to be expected from the espresso brewing-head units of the invention. For instance, a pot-shaped permanent filter insert need not be deep-drawn or separately produced in a different way.

In one embodiment, the reinforcement ring can be embedded in a particularly advantageous manner in the edge portion by an injection molding process of the coffee receiving container. As a result, one obtains a very intimate connection between reinforcing ring and coffee receiving container, which connection withstands the permanent loads in an optimum manner.

In particular when the espresso brewing-head unit is not mounted via a thread on the brewing unit, but via a bayonet lock, the locking means may be formed as projections radially projecting from the outer wall of the reinforcement ring, the projections forming part of the bayonet-like lock with the brewing unit of the espresso machine. The corresponding receiving element of the bayonet-like lock into which the locking means can be inserted on the espresso brewing-head unit is then located on the brewing unit. Such bayonet-like locks have the advantage that relative exact sealing conditions, for instance by corresponding stops, can be achieved through a corresponding design. Such a design of the espresso brewing-head unit could also readily be used as a retrofit element for already existing espresso machines.

The reinforcement ring can be produced at low costs in one embodiment in that it has substantially the shape of a cylindrical tube. With a corresponding design, existing tubes can here be used which have just to be cut to length.

Since a correspondingly symmetrical construction is of advantage, the edge portion can also have a circular annular cross-section and the reinforcement ring may be arranged coaxial to the edge portion. Such an embodiment is especially of advantage in the case of thread or bayonet locks.

The reinforcement ring itself can be used as a pressing medium to be pressed against a seal when according to one embodiment the upwardly oriented edge of the reinforcement ring projects beyond the upper edge of the coffee receiving container. Upper edge of the coffee receiving container means here the edge portion which directly surrounds the brewing chamber.

To achieve an inner surface of the coffee receiving container which is as uniform as possible, the inside of the reinforcement ring which is arranged below the upper edge of the coffee receiving container should be covered over the whole surface with a plastic layer. This means that the reinforcement ring is arranged at a distance from the brewing chamber by the amount of the plastic layer thickness.

To embed the reinforcement ring in a manner which is as aesthetic as possible and to avoid any transmission of the loads occurring during detachment and attachment of the unit, in particular wear phenomena, to the reinforcement ring, the outside of the reinforcement ring which is arranged below the upper edge of the coffee receiving container, including the attachment portions, is covered in one embodiment substantially over the whole surface with a plastic layer. Since the attachment portions and the locking means, respectively, have a plastic layer on their outside due to this measure, good wear characteristics are obtained because of the presence of advantageous coefficients of friction. These plastic layers can easily carry the corresponding loads by means of the metal insert which is embedded therein in the form of the attachment portions.

Preferably, the attachment portions on the reinforcement ring can be formed as fixing webs which are substantially formed in the manner of a circular arc and which are arranged substantially in perpendicular direction on the outer surface of the reinforcement ring and radially project radially therefrom. It is even not necessary that the fixing webs, which are formed in the manner of a circular arc, have an extension forming part of a thread, such an extension being of advantage to a bayonet lock, since these webs can be coated according to one embodiment with plastic material so that the plastic material is formed to extend as part of a thread, while the fixing webs extend in a radial plane of the reinforcement ring.

The filter disc, which preferably consists of metal, is advantageously embedded with its edge portion also by an injection molding process in the side wall of the coffee receiving container. The design of a stable filter disc including filter openings that are as sharp-edged as possible is of great advantage to the formation of a fine head or cream in espresso filter units. According to this embodiment the filter disc is very intimately connected to the remaining coffee receiving container in a simple manner.

In a further embodiment, the edge of the filter disc is embedded in a separate plastic frame which is inserted into a surrounding stepped portion on the inside of the coffee receiving container. It is possible with the plastic frame to integrate filter discs of a relatively complicated structure with additional support elements and distributor discs in the coffee receiving container.

In an advantageous embodiment, the plastic frame is connected to the coffee receiving container not in a replaceable manner, but fixedly, whereby a seal becomes superfluous.

There is also the possibility that the inner wall of the coffee receiving container forms a surrounding support rib for increasing the support surface of the stepped portion. The support rib extends radially inwards and enhances the ability to receive high forces of pressure that act on the filter disc and thus on the frame.

According to a further embodiment, the coffee receiving container is shaped in a tubular manner below the filter disc and/or comprises a downwardly oriented annular web which has attached thereto a distributor disc with an attachment collar that has the desired number of exit openings. On the one hand, thanks to this design, the filter disc can very easily be cleaned from both sides, as the distributor disc can be removed; on the other hand, the distributor disc comprises exit openings whose number depends on the number of the drinking vessels arranged under the disc. Distributor discs are normally used with just one exit opening or two exit openings.

In one embodiment, handling is particularly simplified due to the fact that a substantially radially projecting grip portion is arranged laterally on the outer surface of the coffee receiving container.

To be able to make the wall of the coffee receiving container thinner, the plastic material may be a reinforced, in particular glass-reinforced, plastic material. However, any other type of reinforcement that is possible in a plastic material can be used. In particular methods have become known in which small glass spheres or bodies are arranged in the plastic material and are injected during the injection molding process. The glass bodies are molten in a specific method and form an intimate grid structure.

Furthermore, there is the possibility that the reinforcement ring is made by metal die casting. As a result, the reinforcement ring can also be made in a simple manner. Moreover, such a mode of manufacture permits any desired design of the attachment portions, so that the bayonet lock may, for instance, be completely made by metal die casting.

The reinforcement ring is advantageously provided on its lower edge portion with anchoring means for anchoring in plastic material by way of an injection molding process. The reinforcement ring is thereby anchored in the plastic embedding once again, so that even upon application of relatively great forces it cannot get detached.

The anchoring means may, for instance, be formed by a conical shape of the inside and/or outside of the lower edge portion. Thanks to the conical shape, a corresponding anchoring resistance can, in particular, be offered to a force which is operative in the axial direction of the reinforcement ring.

BACKGROUND OF THE INVENTION

To ensure adequate anchoring to prevent rotation of the reinforcement ring, a toothing may be provided on the lower edge portion as an anchoring means into which the injected plastic material penetrates and locks the reinforcement ring accordingly.

BRIEF DESCRIPTION OF THE DRAWINGS

Embodiments of the present invention shall now be explained in more detail with reference to a drawing, in which.

DETAILED DESCRIPTION OF THE INVENTION

Figure 1:
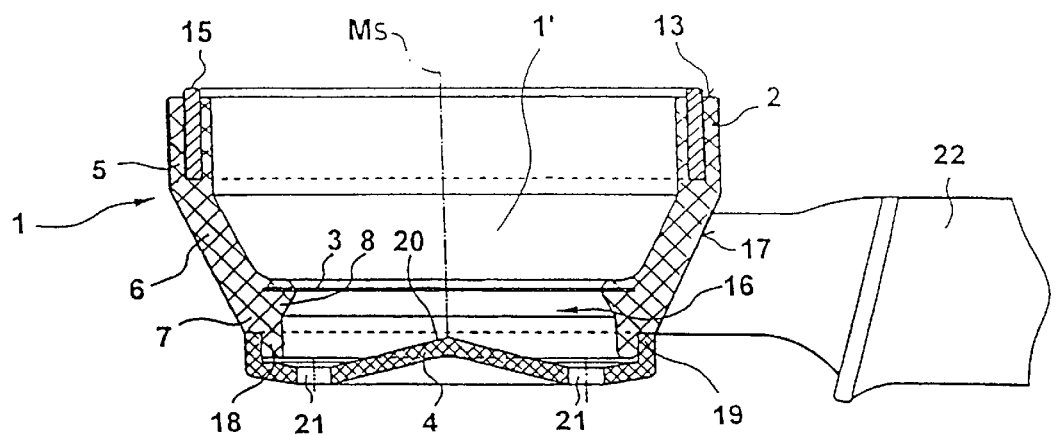
FIG. 1 shows an espresso brewing-head unit according to the present invention, in which the coffee receiving container is shown in half section and the handle part in an incomplete manner.
Figure 2:
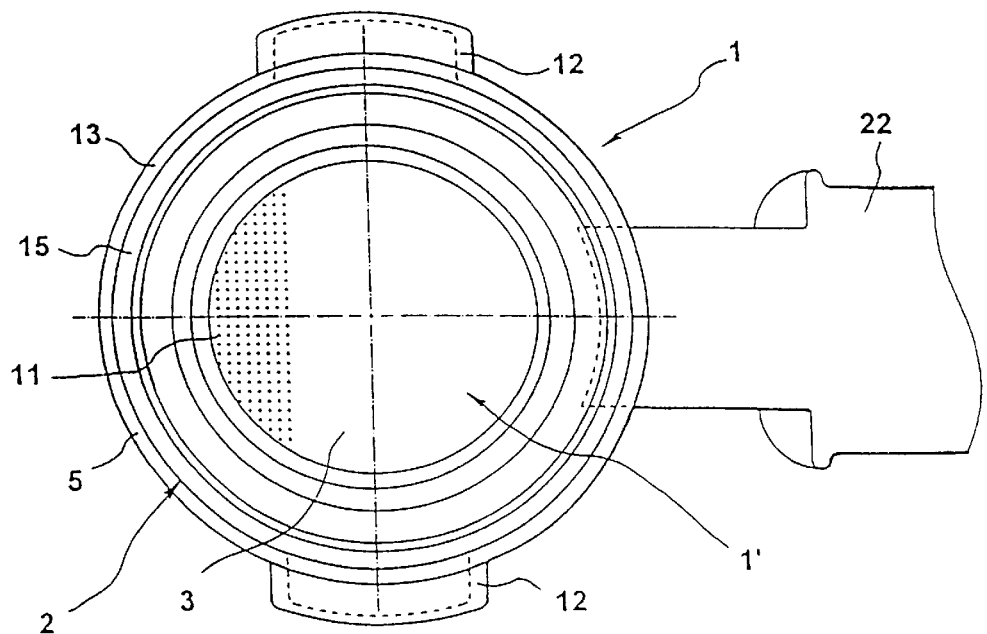
FIG. 2 shows the espresso brewing-head unit of FIG. 1 in a top view.
Figure 3:
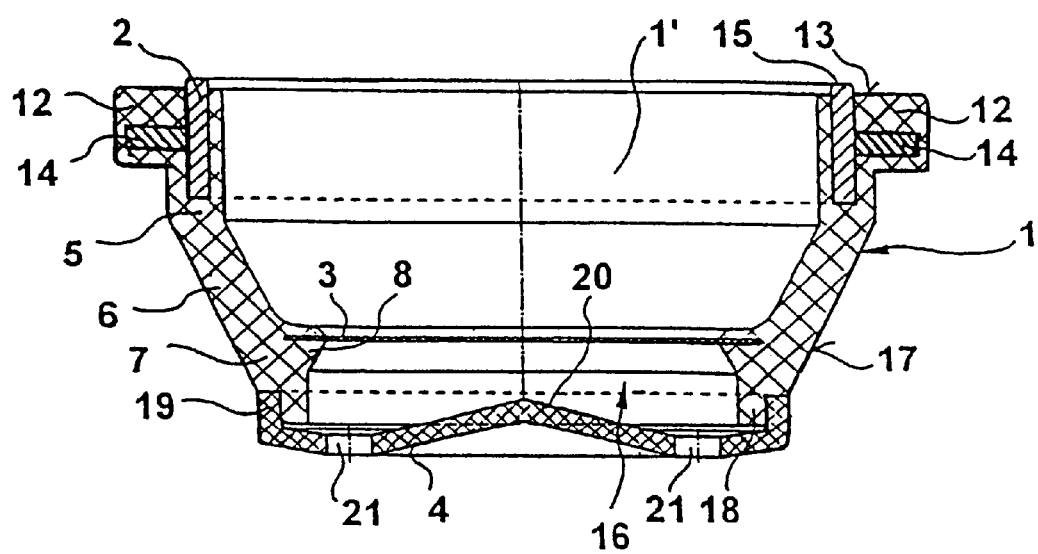
FIG. 3 shows the espresso brewing-head unit of FIG. 1 in a side view and in full section.
Figure 4:
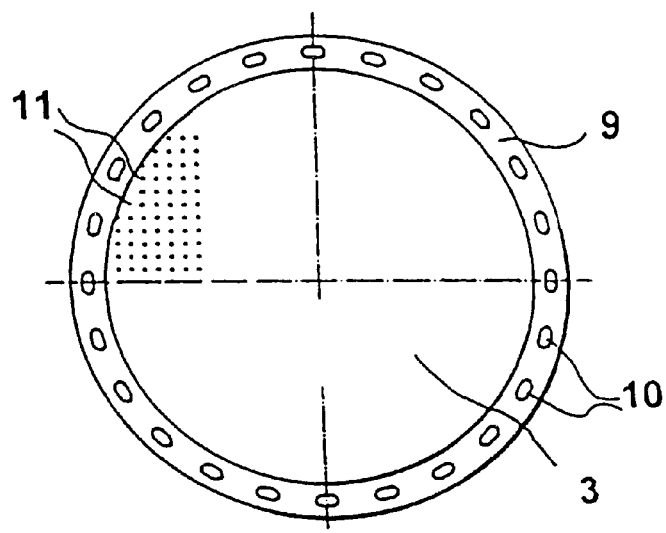
FIG. 4 shows the filter plate of FIG. 1 in a top view.
Figure 5:
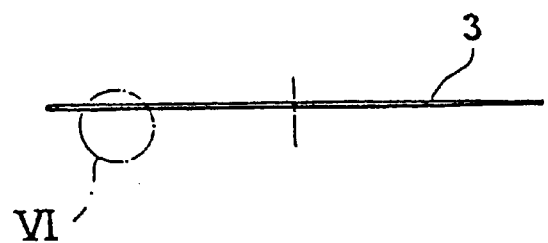
FIG. 5 shows the filter plate of FIG. 4 in a side view.
Figure 6:
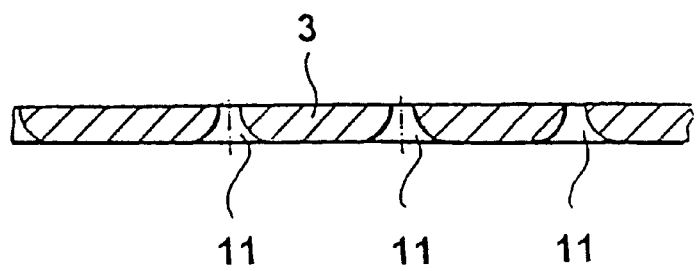
FIG. 6 shows section VI in FIG. 5 of the filter plate on an enlarged scale.
Figure 7:
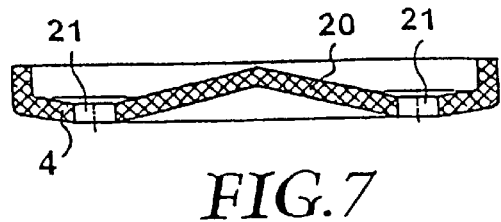
FIG. 7 shows the distributor disc of FIG. 1 in full section.
Figure 8:
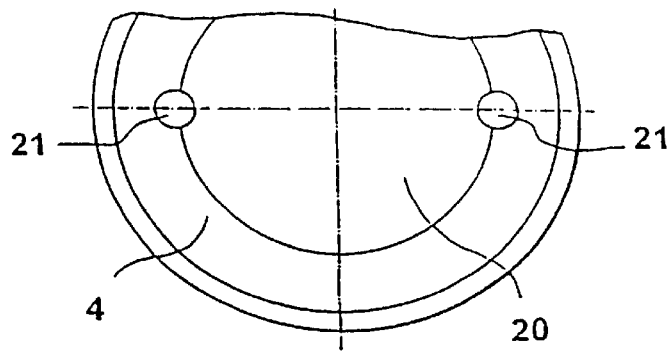
FIG. 8 shows the distributor disc of FIG. 7 in a top view and partly cut away.
Figure 9:
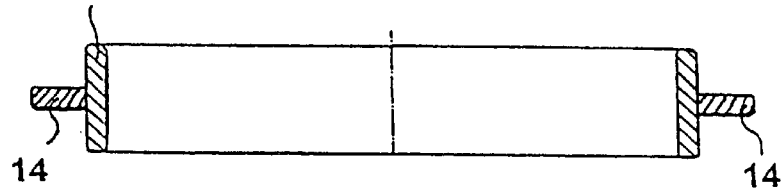
FIG. 9 shows the reinforcement ring of FIG. 3 in full section.

A first embodiment of the espresso brewing-head unit shall now be described in more detail with reference to FIGS. 1 to 10.

The espresso brewing-head unit substantially comprises a coffee receiving container 1 which has a circular cross-section and is made from a plastic material, a cylindrical reinforcement ring 2 of metal, preferably steel, which is embedded in the container, a circular planar filter plate 3 which forms the bottom of the coffee receiving container 1, and a distributor disc 4 which is mounted below the filter plate 3 on the coffee receiving container 1.

In its upper edge portion 5, the coffee receiving container 1 has the shape of a cylindrical tube and then passes into a conical portion 6 which is provided on its lower end portion 7 with an internally surrounding ring rib 8 into which the edge 9 of the filter disc 3 (see FIG. 4) is embedded. To enable the plastic material of the coffee receiving container 1 to join the filter plate 3 during the manufacturing process in an improved manner, the edge 9 has a plurality of recesses 10 which are arranged in offset fashion relative to one another. Moreover, the filter plate 3 has a large number of small filter openings 11 which are designed in flow direction in the manner of a diffusor. According to FIG. 6 liquid flows through the filter plate 3 from the top to the bottom.

Furthermore, the upper edge portion 5 of the coffee receiving container 1 is provided on its outer circumference with two oppositely arranged locking webs 12 which end substantially flush with the upper side 13 of the edge portion 5. The figures do not show that the locking webs 12 have at least one side (upper or lower side) which extends in the manner of a part of a thread or in the manner of a ramp. The locking webs 12 cooperate with a corresponding receiving portion of a brewing device of an espresso machine in the manner of a bayonet lock.

The reinforcement ring 2 which is arranged coaxial to the upper edge portion 5 of the coffee receiving container 1 is provided at the level of the locking webs 12 with two fixing webs 14 which are offset relative to one another by 180° and which are arranged in perpendicular direction on the outside of the reinforcement ring 2 and extend substantially in a radial plane. The fixing webs 14 extend portionwise into the locking webs 12 and reinforce said webs 12 in the manner of a reinforcement. However, it is also possible that the fixing webs 14 simultaneously form the locking webs 12 and consequently project laterally, in any desired form, freely from the coffee receiving container 1.

The upwardly oriented edge 15 of the reinforcement ring 2 slightly projects beyond the upper side 13 of the coffee receiving container 1, preferably by 1 to 2 mm. Hence, edge 15 forms a surrounding sealing web. All of the other surface areas of the reinforcement ring 2, including the fixing webs 14, are fully embedded in the plastic material of the coffee receiving container 1 and are provided on all sides with a corresponding plastic layer.

Underneath the filter plate 3, the lower end portion 7 of the coffee receiving container 1 has the shape of a cylindrical tube, thereby defining a liquid collecting chamber 16. A surrounding, downwardly oriented annular web 18 in the form of a cylindrical tube is arranged in radially inwardly offset fashion relative to the conical outside 17, and an exactly fitting surrounding attachment collar 19 can be attached to the annular web 18. The outer circumference of the attachment collar 19 then joins the outside 17 of the lower end portion 7 without any change in diameter.

The distributor disc 4 has an inwardly raised conical portion 20 at the edge of which two outlet openings 21, which are offset by 180°, are located. The outlet openings 21 communicate with the collection chamber 16 and extend through the entire thickness of the distributor disc 4. The distributor disc 4 can releasably be attached to the annular web 18, or it may be fixedly connected to the web. Other mounting possibilities, for examples screws or the like, do also exist.

Figure 10:
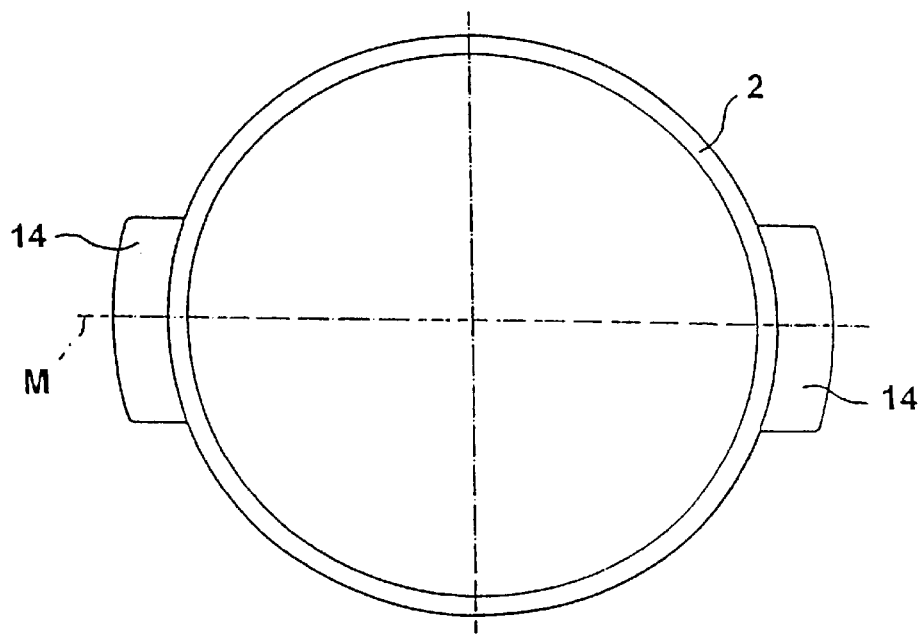
FIG. 10 shows the reinforcement ring of FIG. 9 in a top view.

As follows from FIG. 10, the two fixing webs 14 which are offset relative to each other by 180° represent respective circular ring sections which are cut off in parallel with the center line M drawn in FIG. 10. The fixing webs 14 are arranged on the outer surface of the reinforcement ring 2, each over a portion of about 40°.

Moreover, a handle 22 which radially projects relative to the center point of the coffee receiving container 1 is laterally mounted on the outside of the coffee receiving container 1. The handle 22 can also be made from a plastic material, preferably in such a manner that it is integral with the coffee receiving container 1.

Any type of plastic material which provides for suitable strength values may be used as the plastic material for making the coffee receiving container 1. However, it is also possible to use a reinforced plastic material, in particular a glass-reinforced plastic material. The wall thickness of the coffee receiving container 1 depends on the desired strength. In the illustrated embodiment the upper edge portion 5 and the conical portion 6 have substantially the same material thickness.

The operation and function of the above-described embodiment shall now be explained in more detail:

The illustrated expresso brewing-head unit is gripped at the handle 22 for making an espresso and the coffee receiving chamber 1' which is defined by the coffee receiving container 1 and arranged above the filter plate 3 is filled with ground coffee. The espresso brewing-head unit is then secured to the brewing device of an espresso machine. To this end, the locking webs 12 are introduced into the corresponding receiving portions of the brewing device and, as soon as a stop has been reached, the locking webs 12 are brought into their locking position by a pivotal movement about the center axis $M_S$ of the handle 22. The locking webs 12 are shaped such that during said pivotal movement of the bayonet-shaped lock an upwardly directed axial movement of the coffee receiving container 1 takes place at the same time. As a result, the upwardly oriented edge 15 of the reinforcement ring 2 is pressed with a corresponding desired force against a seal. Thanks to the relatively small surface of the edge 15, high contact pressures are possible in a simple manner, with the pressures ensuring a sufficient seal. Moreover, such a kind of seal is very wear-resistant, at least as far as the espresso brewing-head unit is concerned, since the reinforcement ring consists of metal, preferably stainless steel. The edge 15 may also be rounded accordingly for such a purpose.

The fixing webs 14 ensure that even in the case of very frequent detaching and attaching operations on the brewing device of an espresso machine the locking webs 12 will not suffer any fatigue fracture. The whole bayonet lock can be simplified thanks to the reinforcement provided by means of the fixing webs 14, since as far as the espresso brewing-head unit is concerned, soft plastic surfaces are provided by the locking web 12 as fixing surfaces that slide on one another.

Hot water is subsequently pressed by the brewing device through the ground coffee, so that liquid is pressed through the filter plate 3. The liquid is filtered in an advantageous manner thanks to the design of the filter openings. The liquid is collected at a small pressure in the liquid collecting chamber 16 and then exits through the outlet openings 21 and flows into the receiving vessels.

After an espresso has been made, the espresso brewing-head unit is again detached from the brewing unit by a pivotal movement by means of the handle 22 around the pivot axis $M_S$, and the ground coffee is knocked out from the receiving opening 1'. During this operation any objectionable falling out from a pot-shaped permanent filter insert is not observed, since an integral filtering device is here concerned.

Embodiments of the espresso brewing-head unit which differ essentially with respect to the arrangement of the filter plate 3 shall now be described. Only the essential differences with respect to the first embodiment shall here be discussed to avoid repetitions. Therefore, identical reference numerals are used for identical or similar components.

Figure 11:
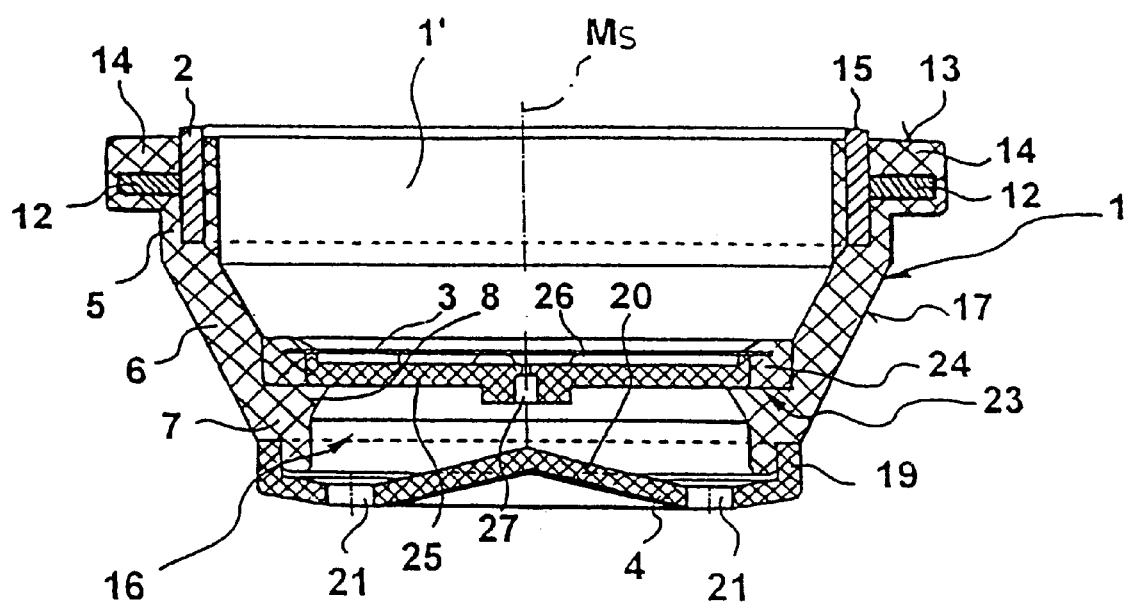
FIG. 11 shows a first variant of the espresso brewing-head unit in full section, similar to FIG. 3.
Figure 12:
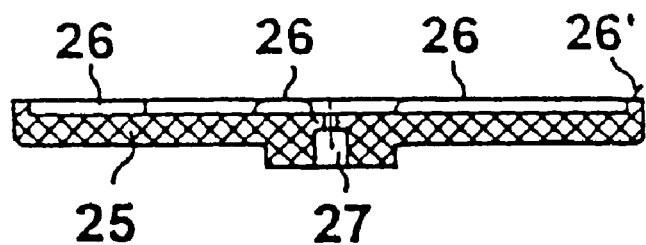
FIG. 12 shows the support plate of FIG. 11 in full section.
Figure 13:
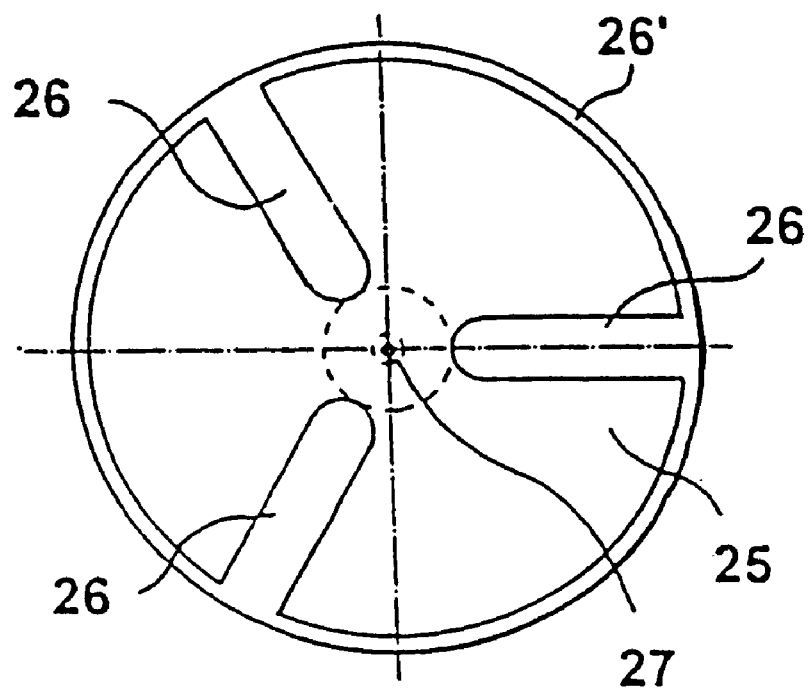
FIG. 13 shows the support plate of FIG. 12 in a top view.

In the first embodiment according to FIGS. 11 to 13, the coffee receiving container 1 is provided at the lower end of the conical portion 6 with a stepped portion 23 the support surface of which is enlarged by the annular rib 8. The filter plate 3 is embedded in an annular frame 24 with its edge 9 which is arranged in a substantially exactly fitting manner in the stepped portion 23. Both a detachably attached arrangement and a fixed arrangement, for instance by a press fit or an adhesive connection, are here possible. A circular support plate 25 is positioned underneath the filter plate 3 and is also held by the frame 24. The support plate 25 is provided on its upper side with radially extending webs 26 and with a surrounding edge web 27. The webs 26 end at a distance from a centrally arranged exit opening 27 which is stepped for achieving a diffusor effect and is given an enlarged size in the flow direction. Hence, liquid is collected below the filter plate 3 and is guided towards the central exit opening 27, where an enhanced swirling action and an improved head or cream formation can be observed. The support plate 25 is thickened in its central portion for this reason.

Figure 14:
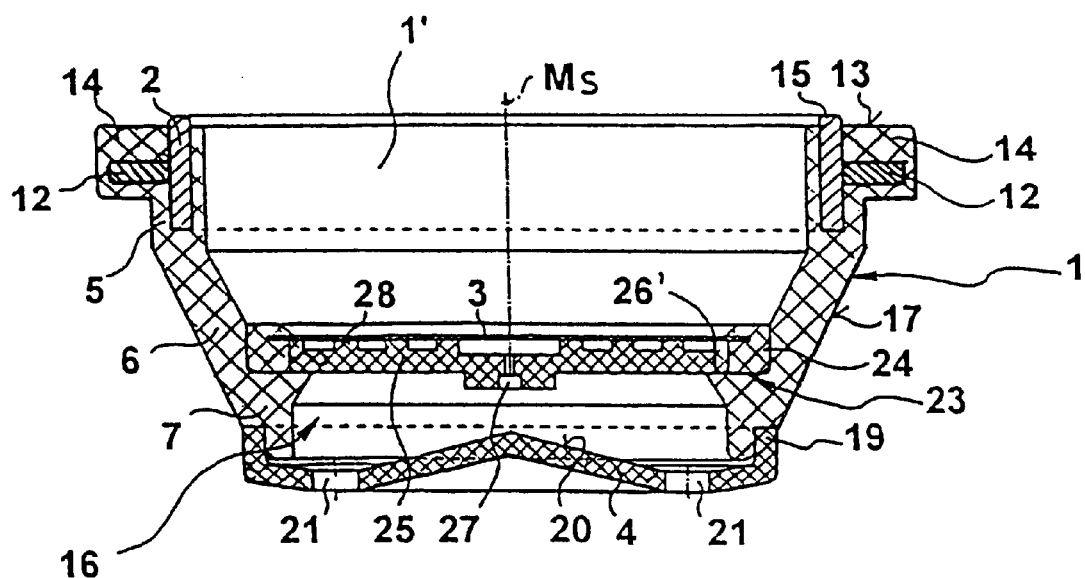
FIG. 14 shows a second variant of the espresso brewing-head unit in full section, similar to FIG. 3.

According to the second embodiment in FIG. 14, a frame 24 is arranged in a similar manner in a stepped portion 24. However, the support plate 25 which is here used is provided with support webs 28 which are arranged in the manner of a labyrinth, so that the liquid must flow along an extended flow path towards the exit opening 28. The webs 28 end again at a distance from the exit opening 27, so that liquid can collect above the exit opening 27.

Figure 15:
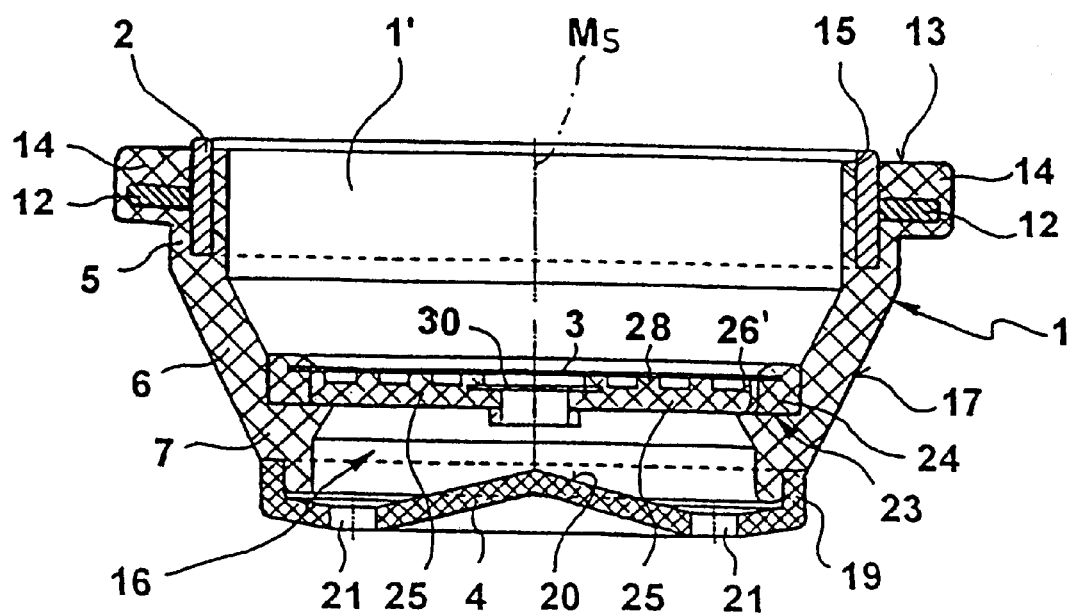
FIG. 15 shows a third variant of an espresso brewing-head unit in full section, similar to FIG. 3.
Figure 16:
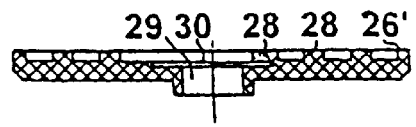
FIG. 16 shows the support plate of FIG. 15 with an additional small filter plate in full section.
Figure 17:
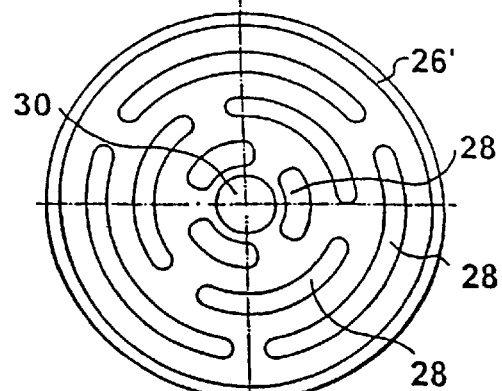
FIG. 17 shows the support plate of FIG. 16 in a top view.
Figure 18:
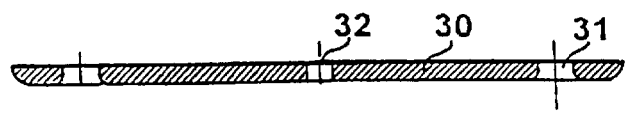
FIG. 18 shows the small filter plate of FIG. 16 in full section and on an enlarged scale.
Figure 19:
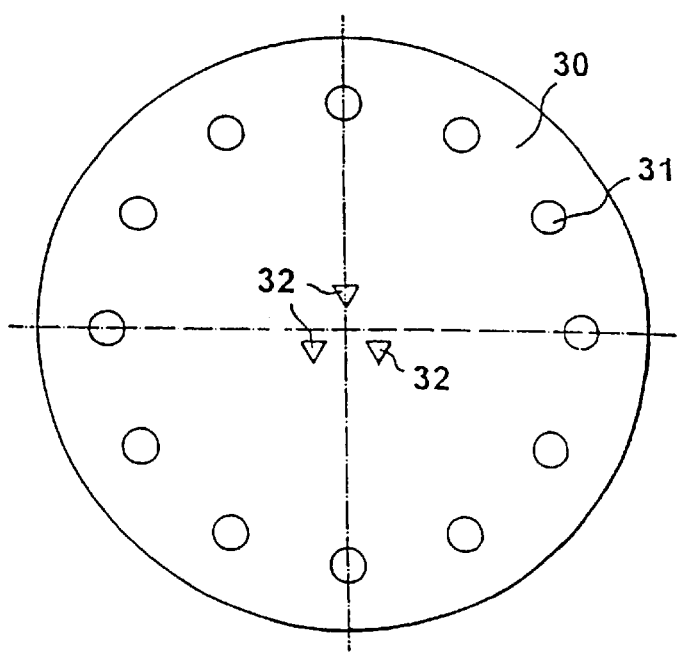
FIG. 19 shows the small filter plate of FIG. 18 in a top view.

The third embodiment according to FIG. 15 comprises a support plate 25 which comprises labyrinth-like webs 28 in a manner similar to that of the support plate in FIG. 14. The difference is that a cylindrical exit opening 29 exists which is covered by a small filter plate 30. On its edge portion the filter plate 30 comprises a plurality of holding openings 21 which are offset relative to one another and into which plastic material of the support plate 25 can penetrate for attaching the filter plate 30 to the support plate 25. Three triangular exit filter openings 32 are arranged in the center portion of the small filter plate 30. The triangular exit openings 32 also ensure an enhanced swirling action and head or cream formation, in particular, by the enlarged exit opening 29.

Figure 20:
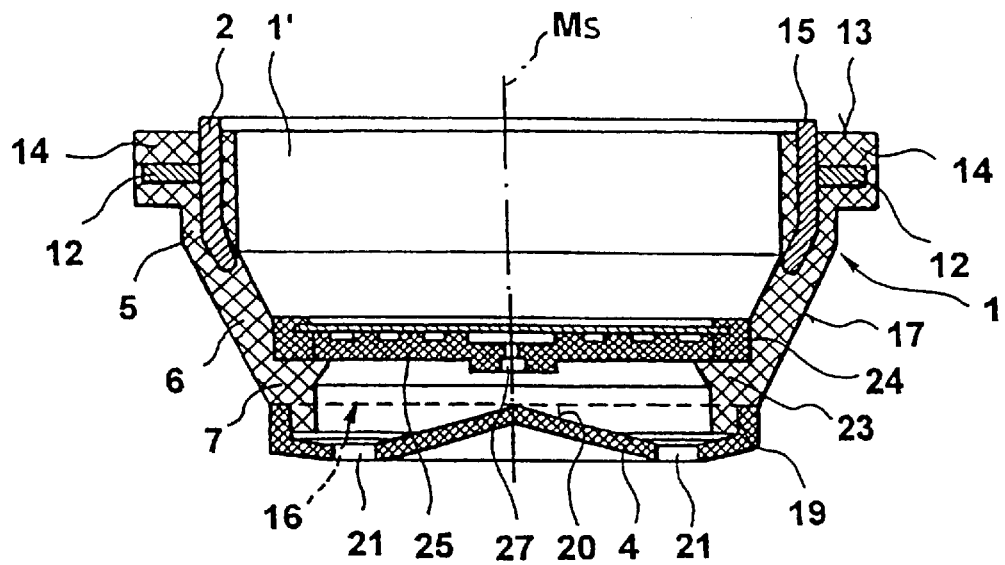
FIG. 20 shows a fourth variant of an espresso brewing-head unit in full section, similar to FIG. 14.

The fourth embodiment according to FIG. 20 is similar to the embodiment of FIG. 14. In this embodiment, however, the reinforcement ring 2 is made by metal die casting and the locking webs 12 merge with the fixing webs 14 to form an integral component by metal die casting. The webs 12, 14 are therefore no longer surrounded by a plastic material. Furthermore, this component can be manufactured in a very simple manner, because it can be manufactured at great numbers of pieces.

Figure 21:
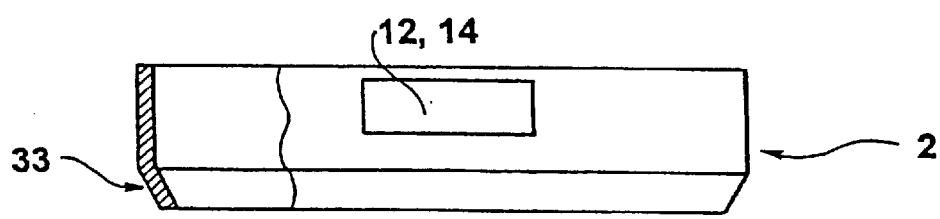
FIG. 21 shows the reinforcement ring of FIG. 20 in a turned, partly cut side view.

According to the variant shown in FIG. 21, the lower edge portion 33 of the reinforcement ring 2 has a conical shape, so that this portion is embedded in the conical portion 6 of the coffee receiving container 1 and thus forms an anchorage.

Figure 22:
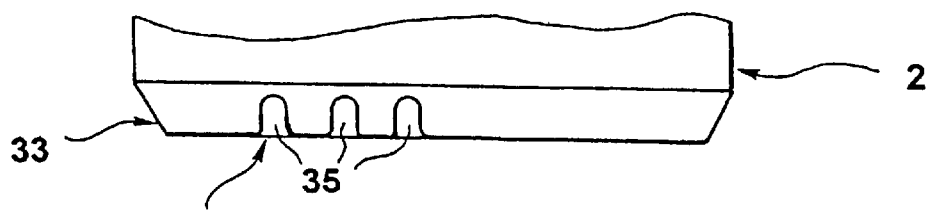
FIG. 22 shows a variant of the lower edge portion of the reinforcement ring.
Figure 23:
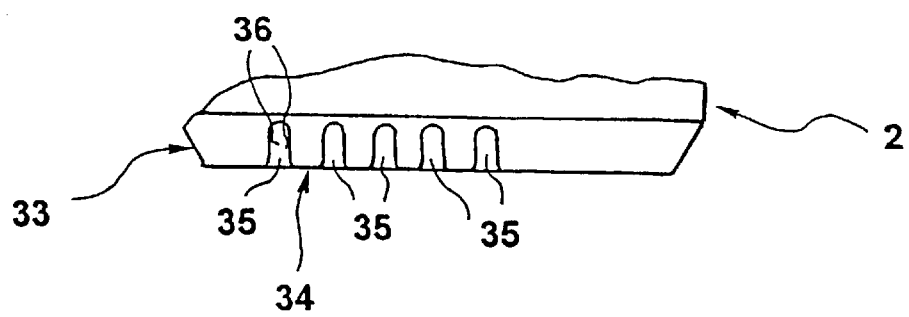
FIG. 23 shows a further variant of the lower edge portion of the reinforcement ring.

As follows from FIGS. 22 and 23, the lower edge portion 33 may be provided with a toothing 34 which is formed by recesses 35 in the lower edge portion 33. According to the embodiment shown in FIG. 23, the toothing 34 is upset in a still hot plastic state in the metal die casting process by a correspondingly shaped punch, so that undercuts 36 are formed in addition, with the undercuts further improving the fixation in the plastic material.

These various designs of the lower edge portion 33 of the reinforcement ring 2 can of course be used with all of the above-described embodiments of the reinforcement ring 2.

What is claimed is:

1. An espresso brewing-head unit comprising locking means (12) for detachable attachment to an espresso machine, comprising a pot-shaped coffee receiving container (1) made of plastic material and having a bottom and a side wall with an upper edge defining an upper open end of the container, a filter plate (3), with coffee exit openings (11), disposed in said bottom; and a reinforcement member (2) of a stable material embedded in said upper edge portion (5) of said side wall, said reinforcement member (2) including attachment portions (14) which form at least part of the locking means (12).

2. The espresso brewing-head unit according to claim 1, characterized in that the reinforcement member (2) is embedded in the edge portion (5) by way of the injection molding process of the coffee receiving container (1).

3. The espresso brewing-head unit according to claim 1 or 2, characterized in that the locking means (12) are formed as projections (12) which radially project from a portion of the wall in which the reinforcement member is embedded (2) and form part of a bayonet-like lock with the brewing unit of the espresso machine.

4. The espresso brewing-head unit according to claim 1, characterized in that the reinforcement member (2) has substantially the shape of a cylindrical tube surrounding said upper open end.

5. The espresso brewing-head unit according to claim 4, characterized in that the edge portion (5) has a circular annular cross-section, and the reinforcement member (2) is arranged coaxial to the edge portion (5).

6. The espresso brewing-head unit according to claim 1 characterized in that an upwardly oriented edge (15) of the reinforcement member (2) projects beyond an upper surface (13) of the coffee receiving container (1).

7. The espresso brewing-head unit according to claim 1, characterized in that the reinforcement member (2) has an inside surface which is arranged below an upper surface (13) of the coffee receiving container (1) and is covered over with a plastic layer.

8. The espresso brewing-head unit according to claim 1, characterized in that the reinforcement member (2) has an outside surface which is arranged below an upper surface (13) of the coffee receiving container (1), includes the attachment portions (14), and is substantially covered over with a plastic layer.

9. The espresso brewing-head unit according to claim 1, characterized in that the attachment portions (14) on the reinforcement member (2) are substantially formed as fixing webs (14) which are shaped in the manner of a circular arc and are arranged substantially in perpendicular direction on an outer surface of the reinforcement member (2) and project radially with respect to said open end.

10. The espresso brewing-head unit according to claim 1, characterized in that the filter plate (3) consists of metal and is embedded along an outer edge portion (9) thereof by injection molding in a portion (7) of the side wall of the coffee receiving container (1).

11. The espresso brewing-head unit according to claim 1, characterized in that the filter plate (3) has an outer edge portion 9 which is embedded in a separate plastic frame (24) which is inserted in a surrounding stepped portion (23) on an inner wall portion of the coffee receiving container (1).

12. The espresso brewing-head unit according to claim 11, characterized in that the plastic frame (24) is fixedly connected to the coffee receiving container (1).

13. The espresso brewing-head unit according to claim 11, characterized in that a labyrinth-type support plate (25) is arranged below the filter plate (3) and is also held by the plastic frame (24).

14. The espresso brewing-head unit according to claim 11, characterized in that the inner wall portion of the coffee receiving container (1) forms a surrounding support rib (8) for increasing the support surface of the stepped portion (23).

15. The espresso brewing-head unit according to claim 1, characterized in that the coffee receiving container (1) has a tubular shape underneath the filter plate (3) and comprises a downwardly oriented annular web (18) which has attached thereto a distributor disc (4) with an attachment collar (19), the distributor disc having a desired number of outlet openings (21).

16. The espresso brewing-head unit according to claim 1, characterized in that a substantially radially projecting handle part (22) is arranged laterally on an outer wall surface of the coffee receiving container (1).

17. The espresso brewing-head unit according to claim 1, characterized in that the plastic material is a glass-reinforced, plastic material.

18. The espresso brewing-head unit according to claim 1, characterized in that the reinforcement member (2) is a metal die casting.

19. The espresso brewing-head unit according to claim 1, characterized in that the reinforcement member (2) comprises anchoring means on a lower edge portion (33) thereof for anchoring purposes in the plastic material.

20. The espresso brewing-head unit according to claim 19, characterized in that the anchoring means is defined by a conical shape on at least one of an inside and outside portion of the lower edge portion (33) of the reinforcement member (2).

21. The espresso brewing-head unit according to claim 19 or 20, characterized in that a toothing (34) is provided on the lower edge portion (33) as the anchoring means.

* * * * *